United States Patent
Choi et al.

(10) Patent No.: US 9,853,328 B2
(45) Date of Patent: Dec. 26, 2017

(54) ELECTROLYTE FOR LITHIUM SECONDARY BATTERIES AND LITHIUM SECONDARY BATTERY INCLUDING THE SAME

(71) Applicant: LG Chem, Ltd., Seoul (KR)

(72) Inventors: Young Geun Choi, Daejeon (KR); Jong Mo Jung, Daejeon (KR); Jonghyun Chae, Daejeon (KR); Chul Haeng Lee, Daejeon (KR); Geun Chang Chung, Daejeon (KR); Yourim Yoon, Daejeon (KR); Young Cheol Choi, Daejeon (KR); Seung Jae Yoon, Daejeon (KR)

(73) Assignee: LG Chem, Ltd. (KR)

( * ) Notice: Subject to any disclaimer, the term of this patent is extended or adjusted under 35 U.S.C. 154(b) by 139 days.

(21) Appl. No.: 14/428,200

(22) PCT Filed: Nov. 22, 2013

(86) PCT No.: PCT/KR2013/010708
§ 371 (c)(1),
(2) Date: Mar. 13, 2015

(87) PCT Pub. No.: WO2014/081254
PCT Pub. Date: May 30, 2014

(65) Prior Publication Data
US 2015/0249271 A1    Sep. 3, 2015

(30) Foreign Application Priority Data

Nov. 22, 2012    (KR) .................. 10-2012-0133275

(51) Int. Cl.
*H01M 10/0569* (2010.01)
*H01M 10/0567* (2010.01)
(Continued)

(52) U.S. Cl.
CPC ....... *H01M 10/0569* (2013.01); *H01M 4/366* (2013.01); *H01M 4/587* (2013.01);
(Continued)

(58) Field of Classification Search
CPC ......... H01M 10/0567; H01M 10/0569; H01M 4/5825
See application file for complete search history.

(56) References Cited

U.S. PATENT DOCUMENTS 6,746,799 B2    6/2004  Yamada et al.
7,226,704 B2 *  6/2007  Panitz ............... H01M 10/0525
                                                       252/62.2
(Continued)

FOREIGN PATENT DOCUMENTS

CN        1333580 A      1/2002
JP      H07014610 A      1/1995
(Continued)

OTHER PUBLICATIONS

International Search Report for Application No. PCT/KR2013/010708 dated Mar. 10, 2014.

*Primary Examiner* — Jonathan Jelsma
(74) *Attorney, Agent, or Firm* — Lerner, David, Littenberg, Krumholz & Mentlik, LLP

(57) ABSTRACT

Disclosed are an electrolyte for lithium secondary batteries including 10 wt % to 90 wt % of an ester based solvent and 10 wt % to 90 wt % of a carbonate based solvent with respect to the total weight of a non-aqueous solvent, and a lithium secondary battery including the same.

16 Claims, 2 Drawing Sheets

(51) Int. Cl.
*H01M 4/36* (2006.01)
*H01M 4/58* (2010.01)
*H01M 4/62* (2006.01)
*H01M 10/052* (2010.01)
*H01M 4/587* (2010.01)

(52) U.S. Cl.
CPC ......... *H01M 4/5825* (2013.01); *H01M 4/625* (2013.01); *H01M 10/052* (2013.01); *H01M 10/0567* (2013.01); *H01M 2300/004* (2013.01); *H01M 2300/0037* (2013.01)

(56) References Cited

U.S. PATENT DOCUMENTS

| | | | |
|---|---|---|---|
| 8,546,024 | B2 | 10/2013 | Jeon et al. |
| 2001/0019800 | A1 | 9/2001 | Herreyre et al. |
| 2002/0039677 | A1 | 4/2002 | Iwamoto et al. |
| 2006/0068297 | A1* | 3/2006 | Tan .................. H01M 10/0569 429/343 |
| 2007/0224514 | A1* | 9/2007 | Kotato ................ H01M 10/056 429/325 |
| 2008/0305401 | A1 | 12/2008 | Smart et al. |
| 2010/0233540 | A1 | 9/2010 | Choy et al. |
| 2010/0279168 | A1 | 11/2010 | Lee et al. |
| 2011/0183166 | A1* | 7/2011 | Suga ....................... H01M 2/30 429/61 |
| 2012/0007560 | A1 | 1/2012 | Smart et al. |
| 2012/0328923 | A1* | 12/2012 | Sawai ..................... H01M 4/13 429/94 |
| 2013/0337327 | A1* | 12/2013 | Sun ..................... H01M 4/0471 429/219 |

FOREIGN PATENT DOCUMENTS

| | | |
|---|---|---|
| JP | H09213366 A | 8/1997 |
| JP | 2004523073 A | 7/2004 |
| JP | 2007035354 A | 2/2007 |
| JP | 2008260346 A | 10/2008 |
| JP | 2009129719 A | 6/2009 |
| JP | 2010507215 A | 3/2010 |
| JP | 2010218937 A | 9/2010 |
| JP | 2010539640 A | 12/2010 |
| JP | 2011508956 A | 3/2011 |
| JP | 2011216272 A | 10/2011 |
| JP | 2012178339 A | 9/2012 |
| KR | 20090027574 A | 3/2009 |
| KR | 100987280 B1 | 10/2010 |
| KR | 20120053464 A * | 5/2012 .......... H01M 4/0471 |
| KR | 20120117234 A | 10/2012 |
| WO | 2012140790 A1 | 10/2012 |
| WO | 2012141001 A1 | 10/2012 |

* cited by examiner

[FIG. 1]
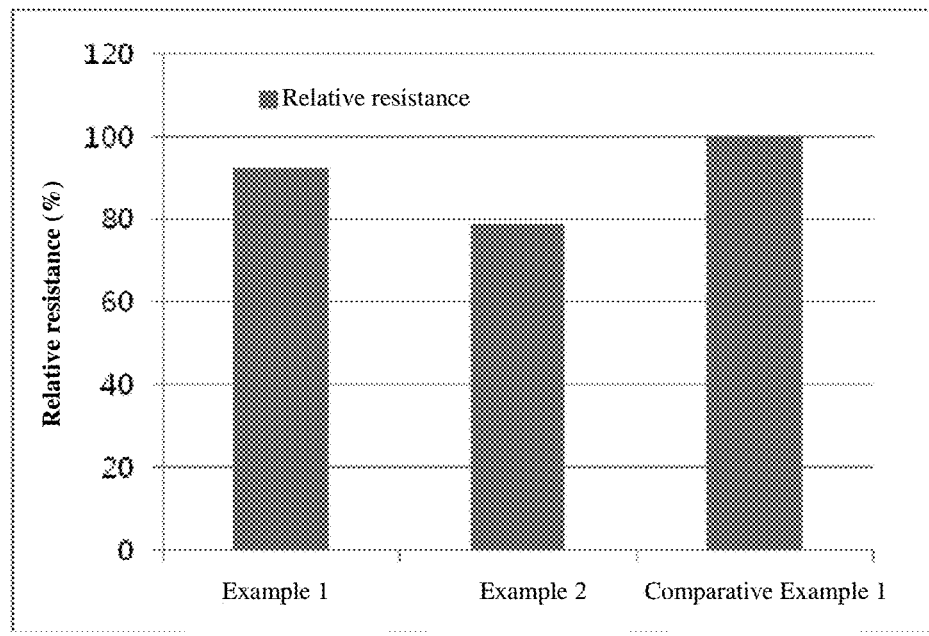
[FIG. 2]
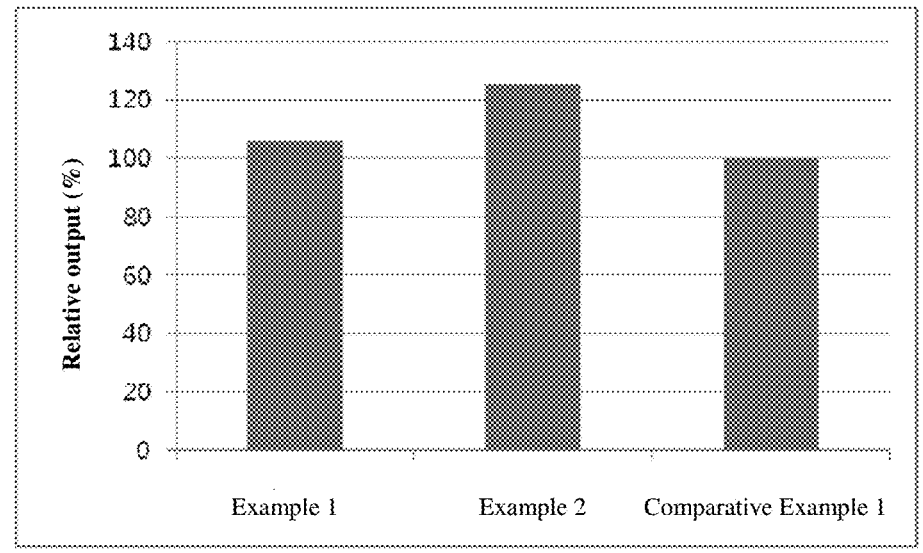

[ FIG. 3 ]
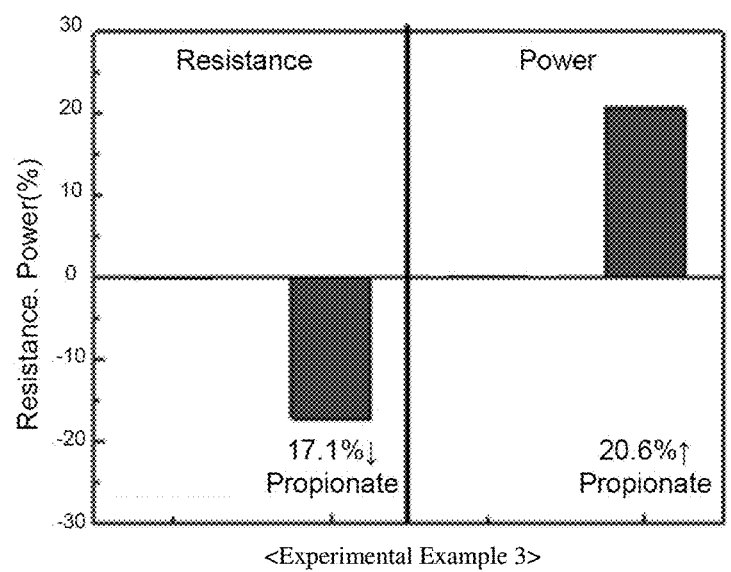
<Experimental Example 3>

ELECTROLYTE FOR LITHIUM SECONDARY BATTERIES AND LITHIUM SECONDARY BATTERY INCLUDING THE SAME

CROSS-REFERENCE TO RELATED APPLICATION

This application is a national phase entry under 35 U.S.C. §371 of International Application No. PCT/KR2013/010708, filed Nov. 22, 2013, which claims priority to Korean Patent Application No. 10-2012-0133275, filed Nov. 22, 2012, the disclosures of which are incorporated herein by reference.

TECHNICAL FIELD

The present invention relates to an electrolyte for lithium secondary batteries and a lithium secondary battery including the same. More particularly, the present invention relates to an electrolyte for lithium secondary batteries including a lithium salt and a non-aqueous solvent, the electrolyte including 10 wt % to 90 wt % of an ester based solvent and 10 wt % to 90 wt % of a carbonate based solvent with respect to the total weight of a non-aqueous solvent, and a lithium secondary battery including the same.

BACKGROUND ART

Demand for lithium secondary batteries as energy sources is rapidly increasing as mobile device technology continues to develop and demand therefor continues to increase. Recently, use of lithium secondary batteries as a power source of electric vehicles (EVs) and hybrid electric vehicles (HEVs) has been realized. Accordingly, research into secondary batteries, which may meet a variety of requirements, is being actively performed. In particular, there is high demand for lithium secondary batteries having high energy density, high discharge voltage, and output stability.

In particular, lithium secondary batteries used in hybrid electric vehicles must exhibit great output in short time and be used for 10 years or more under harsh conditions of repeated charge and discharge on a daily basis. Therefore, there are inevitable requirements for a lithium secondary battery exhibiting superior stability and output characteristics to existing small-sized lithium secondary batteries.

In connection with this, existing lithium secondary batteries generally use a lithium cobalt composite oxide having a layered structure, as a cathode and a graphite-based material as an anode. However, $LiCoO_2$ has advantages such as superior energy density and high-temperature characteristics while having disadvantages such as poor output characteristics. Due to such disadvantages, high output temporarily required at abrupt driving and rapid accelerating is provided from a battery and thus $LiCoO_2$ is not suitable for use in hybrid electric vehicles (HEV) which require high output. In addition, due to characteristics of a method of preparing $LiNiO_2$, it is difficult to apply $LiNiO_2$ to actual production processes at reasonable cost. Furthermore, lithium manganese oxides such as $LiMnO_2$, $LiMn_2O_4$, and the like exhibit drawbacks such as poor cycle characteristics and the like.

Accordingly, a method of using a lithium transition metal phosphate as a cathode active material is under study. The lithium transition metal phosphate is broadly classified into $Li_xM_2(PO_4)_3$ having a NaSICON structure and $LiMPO_4$ having an olivine structure, and considered as a material having superior stability, when compared with existing $LiCoO_2$.

A carbon-based active material is mainly used as an anode active material. The carbon-based active material has a very low discharge potential of approximately −3 V, and exhibits extremely reversible charge/discharge behavior due to uniaxial orientation of a graphene layer, thereby exhibiting superior electrode cycle life.

Meanwhile, lithium secondary batteries are prepared by disposing a porous polymer separator between an anode and a cathode, and inserting a non-aqueous electrolyte containing a lithium salt such as $LiPF_6$ and the like thereinto. Lithium ions of a cathode active material are released and inserted into a carbon layer of an anode during charging, whereas lithium ions of the carbon layer are released and inserted into a cathode active material during discharging. In this regard, a non-aqueous electrolyte between an anode and a cathode functions as a medium migrating lithium ions. Such lithium secondary batteries must be basically in a range of battery operation voltage and have ability to transfer ions at a sufficiently fast speed.

As the non-aqueous electrolyte, existing carbonate based solvents were used. However, carbonate based solvents have problems such as decreased ionic conductivity due to increased viscosity.

Therefore, there is an urgent need to develop technology that may resolve the problems.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, when an electrolyte for secondary batteries, the electrolyte being composed of a predetermined amount of an ester based solvent and carbonate based solvent, is used, desired effects may be accomplished, thus completing the present invention.

Technical Solution

In accordance with one aspect of the present invention, provided is a an electrolyte for lithium secondary batteries including a lithium salt and a non-aqueous solvent, the electrolyte including 10 wt % to 90 wt % of an ester based solvent and 10 wt % to 90 wt % of a carbonate based solvent with respect to the total weight of a non-aqueous solvent.

Generally, carbonate solvents has problems such as low ionic conductivity due to high viscosity. On the other hand, since ester based solvents have relatively lower viscosity than carbonate based solvents, ionic conductivity of an electrolyte may be improved. In addition, due to a melting point of the ester based solvents, superior ionic conductivity may be exhibited even at low temperature.

Accordingly, the electrolyte for secondary batteries according to the present invention uses an electrolyte composed of a predetermined amount of an ester based solvent and carbonate based solvent, thereby maximizing effects thereof.

In particular, the electrolyte may include 40 wt % to 80 wt % of the ester based solvent and 20 wt % to 60 wt % of the carbonate based solvent, more particularly 60 wt % of the ester based solvent and 40 wt % of the carbonate based solvent, with respect to the total weight of a non-aqueous solvent.

When the amount of the ester based solvent is extremely small or the amount of the carbonate based solvent is extremely large, ionic conductivity of an electrolyte may be undesirably deteriorated due to the carbonate based solvent having high viscosity. In addition, if the amount of the ester based solvent is extremely large or the amount of the carbonate based solvent is extremely small, a lithium salt does not readily dissolve in an electrolyte and, thus, ionic dissociation may be undesirably deteriorated.

The ester based solvent, for example, includes at least one selected from the group consisting of methyl acetate, ethyl acetate, propyl acetate, methyl propionate (MP), ethyl propionate (EP), γ-butyrolactone, γ-valerolactone, γ-caprolactone, δ-valerolactone, and ε-caprolactone, but the present invention is not limited thereto.

In particular, the ester based solvent may be methyl propionate (MP) and/or ethyl propionate (EP). That is, methyl propionate (MP) and ethyl propionate (EP) may be used respectively, but, when a mixture of methyl propionate (MP) and ethyl propionate (EP) is used, a mixing ratio of methyl propionate (MP) to ethyl propionate (EP) may be 10:90 to 90:10 based on the total weight of the ester based solvent.

The carbonate based solvent, for example, may be cyclic carbonate. The cyclic carbonate may be at least one of ethylene carbonate (EC), propylene carbonate (PC), 1,2-butylene carbonate, 2,3-butylene carbonate, 1,2-pentylene carbonate, and 2,3-pentylene carbonate.

In addition, the carbonate based solvent may additionally include linear carbonate. The linear carbonate includes at least one of dimethyl carbonate (DMC), diethyl carbonate (DEC), dipropyl carbonate (DPC), ethyl methyl carbonate (EMC), methyl propyl carbonate (MPC) and ethyl propyl carbonate (EPC). In this case, a mixing ratio of the cyclic carbonate to the linear carbonate may be 1:4 to 4:1 based on the total weight of the carbonate based solvent.

In addition, an ether based solvent may be additionally included in the electrolyte according to the present invention. In this case, an included ether based material type is not specifically limited. For example, a solvent including 40 wt % to 60 wt % of an ether based solvent, 20 wt % to 30 wt % of ethylpropionate and 20 wt % to 30 wt % of ethylcarbonate may be included therein. Particularly, a solvent including 50 wt % of an ether based solvent, 30 wt % of ethylpropionate, and 20 wt % of ethylcarbonate may be included therein.

The lithium salt may be at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_6$, LiAlCl$_4$, CH$_3$SO$_3$Li, CF$_3$SO$_3$Li, (CF$_3$SO$_2$)$_2$NLi, chloroborane lithium, lithium tetraphenyl borate, and imides. In addition, the concentration of the lithium salt in an electrolyte may be 0.5 to 3 M, particularly 0.8 to 2 M.

The present invention provides a lithium secondary battery including the electrolyte for lithium secondary batteries.

The lithium secondary battery may include, as a cathode active material, layered compounds such as lithium cobalt oxide (LiCoO$_2$), lithium nickel oxide (LiNiO$_2$) and the like including two transition metals or more and substituted with one transition metal or more, as a lithium transition metal oxide; lithium manganese oxides substituted with one transition metal or more; lithium nickel based oxides represented by Formula LiNi$_{1-y}$M$_y$O$_2$, where M is at least one of Co, Mn, Al, Cu, Fe, Mg, B, Cr, Zn or Ga and 0.01≤y≤0.7; lithium nickel cobalt manganese composite oxides represented by Li$_{1+z}$Ni$_b$Mn$_c$Co$_{1-(b+c+d)}$M$_d$O$_{(2-e)}$A$_e$, where −0.5≤z≤0.5, 0.1≤b≤0.8, 0.1≤c≤0.8, 0≤d≤0.2, 0≤e≤0.2, b+c+d≤1, M=Al, Mg, Cr, Ti, Si or Y, and A is F, P or Cl, such as Li$_{1+z}$Ni$_{1/3}$Co$_{1/3}$Mn$_{1/3}$O$_2$, Li$_{1+z}$Ni$_{0.4}$Mn$_{0.4}$Co$_{0.2}$O$_2$ and the like; Li$_{1+a}$M(PO$_{4-b}$)X$_b$; and the like.

The lithium secondary battery may include (i) a cathode including a lithium metal phosphate according to Formula 1 below, as a cathode active material; and (ii) an anode including amorphous carbon, as an anode active material,

$$Li_{1+a}M(PO_{4-b})X_b \qquad (1)$$

wherein M is at least one selected from metals of Groups II to XII, X is at least one selected from F, S and N, −0.5≤a≤+0.5, and 0≤b≤0.1.

In particular, the lithium metal phosphate may be lithium iron phosphate, which has an olivine crystal structure, according to Formula 2 below:

$$Li_{1+a}Fe_{1-x}M'_x(PO_{4-b})X_b \qquad (2)$$

wherein M' is at least one selected from Al, Mg, Ni, Co, Mn, Ti, Ga, Cu, V, Nb, Zr, Ce, In, Zn, and Y, X is at least one selected from F, S, and N, −0.5≤a≤+0.5, 0≤x≤0.5, and 0≤b≤0.1.

When values of a, b and x are outside the above ranges, conductivity is reduced or it is impossible to maintain the olivine structure of the lithium iron phosphate. In addition, rate characteristics are deteriorated or capacity may be reduced.

More particularly, the lithium metal phosphate having the olivine crystal structure may be LiFePO$_4$, Li(Fe, Mn)PO$_4$, Li(Fe, Co)PO$_4$, Li(Fe, Ni)PO$_4$, or the like, more particularly LiFePO$_4$.

That is, the lithium secondary battery according to the present invention uses LiFePO$_4$ as a cathode active material and amorphous carbon as an anode active material, and thus internal resistance increase, which causes low electrical conductivity of LiFePO$_4$, may be resolved, and superior high-temperature stability and output characteristics may be exhibited.

In addition, when the predetermined electrolyte according to the present invention is applied together, superior room- and low-temperature output characteristics may be exhibited when compared with the case of using a carbonate solvent.

The lithium-containing phosphate may be composed of first particles and/or second particles in which first particles are physically aggregated.

An average particle diameter of the first particles may be 1 nanometer to 300 nanometers and an average particle diameter of the second particles may be 1 to 40 micrometers. Particularly, an average particle diameter of the first particles may be 10 nanometers to 100 nanometers and an average particle diameter of the second particles may be 2 and 30 micrometers. More particularly, an average particle diameter of the second particles may be 3 to 15 micrometers.

When an average particle diameter of the first particles is excessively large, desired improvement of ionic conductivity may not be exhibited. On the other hand when an average particle diameter of the first particles is excessively small, it is not easy to manufacture a battery. In addition, when an average particle diameter of the second particles is excessively large, bulk density is reduced. On the other hand when an average particle diameter of the second particles is excessively small, a process may not be effectively performed.

A specific surface area (BET) of the second particles may be 3 m²/g to 40 m²/g.

The lithium metal phosphate may be coated with a conductive material to improve electrical conductivity, and the conductive material may be at least one selected from conductive carbon, precious metal, metal, and conductive polymer. In particular, when covered with conductive carbon, conductivity may be effectively improved without dramatic increase in preparation cost and weight.

The amount of the conductive carbon may be 0.1 wt % to 10 wt %, particularly 1 wt % to 5 wt %, based on a total weight of the cathode active material. When the amount of the conductive carbon is excessively large, the amount of the lithium metal phosphate is relatively reduced, thereby deteriorating total characteristics of a battery. On the other hand excessively small amount of the conductive carbon is undesirable since it is difficult to improve electrical conductivity.

The conductive carbon may be coated over a surface of each of the first particles and the second particles. For example, the conductive carbon may be coated to a thickness of 0.1 to 100 nanometers over surfaces of the first particles and to a thickness of 1 to 300 nanometers over surfaces of the second particles. When the first particles are coated with 0.5 to 1.5 wt % of the conductive carbon based on a total weight of the cathode active material, a thickness of the carbon coating layer may be approximately 0.1 to 2.0 nanometers.

In the present invention, the amorphous carbon is a carbon-based compound other than crystalline graphite and for example, may be hard carbon and/or soft carbon.

The amorphous carbon may be prepared through a process including thermal-treatment at 1800° C. or less. For example, the hard carbon may be prepared through thermal decomposition of a phenolic resin or a furan resin and the soft carbon may be prepared through carbonization of coke, needle coke, or pitch.

An XRD spectrum of an anode to which the amorphous carbon was applied is illustrated in FIG. 1.

Hereinafter, a composition of the lithium secondary battery according to the present invention will be described.

The lithium secondary battery according to the present invention includes a cathode, which is prepared by coating a mixture of the cathode active material, a conductive material, and a binder on a cathode current collector and drying and pressing the coated cathode current collector, and an anode prepared using the same method as that used to manufacture the cathode. In this case, the mixture may further include a filler as desired.

The cathode current collector is generally fabricated to a thickness of 3 to 500 micrometers. The cathode current collector is not particularly limited so long as it does not cause chemical changes in the fabricated secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 wt % to 50 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 wt % to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

An anode current collector is typically fabricated to a thickness of 3 to 500 micrometers. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material. In addition, the anode current collector may be used in various forms including films, sheets, foils, nets, porous structures, foams, and non-woven fabrics.

The lithium secondary battery may have a structure in which an electrode assembly, which includes a cathode, an anode, and a separator disposed between the cathode and the anode, is impregnated with the electrolyte.

The separator is disposed between the cathode and the anode and an insulating thin film having high ion permeability and mechanical strength is used as the separator. The separator typically has a pore diameter of 0.01 to 10 micrometers and a thickness of 5 to 300 micrometers. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The lithium salt-containing electrolyte is composed of the non-aqueous organic electrolyte as described above and a lithium salt and additionally may include a non-aqueous organic solvent, an organic solid electrolyte, an inorganic solid electrolyte, and the like, but the present invention is not limited thereto.

Examples of the organic solid electrolyte include polyethylene derivatives, polyethylene oxide derivatives, polypropylene oxide derivatives, phosphoric acid ester polymers, agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

In addition, in order to improve charge/discharge characteristics and flame retardancy, for example, pyridine, triethylphosphite, triethanolamine, ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

The present invention provides a battery module including the lithium secondary battery as a unit cell and a battery pack including the battery module.

The battery pack may be used as a power source for devices that require stability at high temperature, long cycle life, and high rate characteristics.

Examples of the devices include electric vehicles, hybrid electric vehicles (HEVs), plug-in hybrid electric vehicles (PHEVs), and the like, and the secondary battery according to the present invention may be desirably used in hybrid electric vehicles due to superior output characteristics thereof.

Recently, research into use of a lithium secondary battery in an energy storage system, in which unused power is converted into physical or chemical energy for storage and when necessary, the converted energy is used as electric energy, is being actively performed.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a graph illustrating relative resistances of secondary batteries according to Experimental Example 1 of the present invention;

FIG. 2 is a graph illustrating room-temperature output characteristics of secondary batteries according to Experimental Example 2 of the present invention; and FIG. 3 is a graph illustrating relative resistances and relative output characteristics of secondary batteries according to Experimental Example 3 of the present invention.

MODE FOR INVENTION

Now, the present invention will be described in more detail with reference to the following examples. These examples are provided only for illustration of the present invention and should not be construed as limiting the scope and spirit of the present invention.

Example 1

88 wt % of $Li(Ni0.4Mn0.3Co0.3)O_2$ as a cathode active material, 8.5 wt % of Super-P as a conductive material, and 3.5 wt % of PVdF as a binder were added to NMP to prepare a cathode mixture slurry. The resulting cathode mixture slurry was coated, dried, and pressed over one side of aluminum foil to prepare a cathode.

95.8 wt % of Graphite as an anode active material, 1 wt % of Super-P as a conductive material, and 2.2 wt % of SBR as a binder, and 1 wt % of a thickener were added to $H_2O$ as a solvent to prepare an anode mixture slurry. The resulting anode mixture slurry was coated, dried, and pressed over one side of copper foil to prepare an anode.

The cathode and the anode were laminated using Celgard as a separator to prepare an electrode assembly. Subsequently, a lithium non-aqueous electrolyte including 1M $LiPF_6$ was added to a solvent including 60 wt % of methyl propionate based solvent and 40 wt % of a carbonate based solvent to manufacture a lithium secondary battery.

Example 2

A lithium secondary battery was manufactured in the same manner as in Example 1, except that a solvent including 60 wt % of an ethyl propionate based solvent and 40 wt % of carbonate based solvent was used.

Example 3

A lithium secondary battery was manufactured in the same manner as in Example 1, except that $LiFePO_4$ as a cathode active material, and a solvent including 50 wt % of ether based solvent, 30 wt % of ethylpropionate, and 20 wt % of ethylcarbonate were used.

Comparative Example 1

A lithium secondary battery was manufactured in the same manner as in Example 1, except that 100 wt % of a carbonate based solvent was used.

Comparative Example 2

A lithium secondary battery was manufactured in the same manner as in Example 1, except that $LiFePO_4$ as a cathode active material, and a solvent including 80 wt % of an ether based solvent, and 20 wt % of ethylcarbonate were used.

Experimental Example 1

Relative resistances of the lithium secondary batteries manufactured according to Example 1 and Comparative Examples 1 and 2 were measured. Results are illustrated in FIG. 1 below.

As shown in FIG. 1, it can be confirmed that the batteries including the electrolyte composed of propionate and the carbonate solvent according to Examples 1 and 2 of the present invention exhibit lower resistance, when compared with the batteries according to comparative examples.

Experimental Example 2

Room-temperature output characteristics of the lithium secondary batteries manufactured according to Examples 1 and 2 Comparative Example 1 were measured under a condition of 10 s HPPC at 50% SOC. Results are illustrated in FIG. 2 below.

Relative resistance was measured under a condition of 3 cycles (CC discharge→rest for 20 min→CC/CV charge)

→rest for 30 min→9 cycles (CC discharge at 10% SOC→rest for 1 hr→10 C discharge for 10 s→rest for 30 min→10 C charge for 10 s→rest for 30 min) Subsequently, relative output was measured at 50% SOC according to an output calculation formula below.

Output calculation formula=$OCV_{SOC50\%}$ $X(OCV_{SOC50\%}-V\text{min})/R_{SOC50\%}$ As shown in FIG. 3, it can be confirmed that the batteries including the electrolyte composed of propionate and the carbonate solvent according to Examples 1 and 2 of the present invention exhibit superior room-temperature output characteristics, when compared with the batteries according to comparative examples.

Experimental Example 3

Resistances and room-temperature output characteristics of the batteries according to Example 3 and Comparative Example 2 were measured, and a relative resistance and room-temperature output characteristics of the battery according to Example 3 based on Comparative Example 2 are illustrated in FIG. 3 below.

Relative resistance was measured under a condition of 3 cycles (CC discharge→rest for 20 min→CC/CV charge)→rest for 30 min→9 cycles×(CC discharge at 10% SOC→rest for 1 hr→10 C discharge for 10 s→rest for 30 min→10 C charge for 10 s→rest for 30 min) Subsequently, relative output was measured at 50% SOC according to an output calculation formula below.

As shown in FIG. 3 below, it can be confirmed that the battery according to Example 3 exhibits resistance reduced by 17% and output increased by 20%, when compared with the battery according to Comparative Example 1. In this regard, to overcome a drawback of an ether based electrolyte such as electrolyte decomposition due to crystalline carbon, a propionate based electrolyte was used and, as such, high output was realized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, since a secondary battery according to the present invention includes an electrolyte including a predetermined amount of ester based solvent and carbonate based solvent, ionic conductivity is improved, thereby exhibiting superior output characteristics. In particular, the secondary battery may have superior output characteristics even at low temperature due to a low melting point of the ester based solvent.

When the electrolyte is used with lithium iron phosphate having an olivine crystal structure and amorphous carbon, internal resistance of a battery is reduced. Accordingly, rate characteristics and output characteristics of the battery are further improved and, thus, the battery may be suitably used in hybrid electric vehicles.

The invention claimed is:

1. An electrolyte for lithium secondary batteries comprising a lithium salt and a non-aqueous solvent, wherein the non-aqueous solvent comprises an ester based solvent, a carbonate based solvent, and an ether based solvent wherein the ester based solvent is present in an amount ranging from 20 wt % to 30 wt %-, the carbonate based solvent is present in an amount ranging from 20 wt % to 30 wt %-, and the ether based solvent is present in an amount ranging from 40 wt % to 60 wt % with respect to a total weight of the non-aqueous solvent, and wherein the ester based solvent is at least one selected from the group consisting of methyl acetate, ethyl acetate, propyl acetate, methyl propionate (MP), ethyl propionate (EP), γ-butyrolactone, γ-valerolactone, γ-caprolactone, δ-valerolactone, and ε-caprolactone, and wherein the lithium salt consists of at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_6$, LiAlCl$_4$, CH$_3$SO$_3$Li, CF$_3$SO$_3$Li, (CF$_3$SO$_2$)$_2$NLi, chloroborane lithium, lithium tetraphenyl borate, and imides.

2. The electrolyte according to claim 1, wherein the ester based solvent comprises at least one of methyl propionate (MP) or ethyl propionate (EP).

3. The electrolyte according to claim 2, wherein a mixing ratio of the methyl propionate (MP) to ethyl propionate (EP) is 10:90 to 90:10 based on the total weight of the ester based solvent.

4. The electrolyte for lithium secondary batteries according to claim 1, wherein the carbonate based solvent comprises a cyclic carbonate, and the cyclic carbonate is at least one of ethylene carbonate (EC), propylene carbonate (PC), 1,2-butylene carbonate, 2,3-butylene carbonate, 1,2-pentylene carbonate, or 2,3-pentylene carbonate.

5. The electrolyte for lithium secondary batteries according to claim 4, wherein the carbonate based solvent comprises the cyclic carbonate and a linear carbonate, and the linear carbonate is at least one of dimethyl carbonate (DMC), diethyl carbonate (DEC), dipropyl carbonate (DPC), ethyl methyl carbonate (EMC), methyl propyl carbonate (MPC), or ethyl propyl carbonate (EPC), and the cyclic carbonate and the linear carbonate are mixed in a weight ratio of 1:4 to 4:1.

6. The electrolyte for lithium secondary batteries according to claim 1, wherein a concentration of the lithium salt in the electrolyte is 0.5 to 3 M.

7. A lithium secondary battery comprising the electrolyte for lithium secondary batteries according to claim 1.

8. The lithium secondary battery according to claim 7, wherein the lithium secondary battery comprises:
a cathode comprising a lithium metal phosphate according to Formula 1 below, as a cathode active material; and
an anode comprising amorphous carbon, as an anode active material,

$$Li_{1+a}M(PO_{4-b})X_b \qquad (1)$$

wherein M is at least one selected from metals of Groups II to XII, X is at least one selected from F, S and N, −0.5≤a≤+0.5, and 0≤b≤0.1.

9. The lithium secondary battery according to claim 8, wherein the lithium metal phosphate is a lithium iron phosphate having an olivine crystal structure according to Formula 2 below:

$$Li_{1+a}Fe_{1-x}M'_x(PO_{4-b})X_b \qquad (2)$$

wherein M' is at least one selected from Al, Mg, Ni, Co, Mn, Ti, Ga, Cu, V, Nb, Zr, Ce, In, Zn, and Y,
X is at least one selected from F, S, and N, and
−0.5≤a≤+0.5, 0≤x≤0.5, and 0≤b≤0.1.

10. The lithium secondary battery according to claim 9, wherein the lithium metal phosphate having the olivine crystal structure is $LiFePO_4$.

11. The lithium secondary battery according to claim 10, wherein the lithium iron phosphate having the olivine crystal structure is coated with conductive carbon.

12. The lithium secondary battery according to claim 8, wherein the amorphous carbon is hard carbon and/or soft carbon.

13. A battery module comprising the lithium secondary battery according to claim 7 as a unit cell.

14. A battery pack comprising the battery module according to claim 13.

15. A device comprising the battery pack according to claim 14.

16. The device according to claim 15, wherein the device is a hybrid electric vehicle, a plug-in hybrid electric vehicle, or an energy storage system.

\* \* \* \* \*